(12) United States Patent
Vroom

(10) Patent No.: US 7,341,267 B2
(45) Date of Patent: Mar. 11, 2008

(54) REVERSIBLE RATCHET MECHANISM

(76) Inventor: David H. Vroom, 2410 W. Wetmore Rd., Tucson, AZ (US) 85705

( * ) Notice: Subject to any disclaimer, the term of this patent is extended or adjusted under 35 U.S.C. 154(b) by 300 days.

(21) Appl. No.: 11/159,575

(22) Filed: Jun. 23, 2005

(65) Prior Publication Data

US 2006/0288810 A1 Dec. 28, 2006

(51) Int. Cl.
*B62M 1/14* (2006.01)
(52) U.S. Cl. .................. 280/250; 280/251; 74/25; 74/163
(58) Field of Classification Search ............. 280/246, 280/250.1, 304.1, 241, 252, 250; 74/136, 74/25, 27, 163; 180/250; 474/158, 171; 192/48.92
See application file for complete search history.

(56) References Cited

U.S. PATENT DOCUMENTS

| | | | |
|---|---|---|---|
| 1,058,123 A * | 4/1913 | Whitaker ............... 280/237 |
| 4,453,729 A | 6/1984 | Lucken | |
| 4,583,754 A * | 4/1986 | Seeliger ............... 280/246 |
| 4,758,013 A * | 7/1988 | Agrillo ............... 280/250.1 |
| 4,762,332 A | 8/1988 | Seol | |
| 4,805,711 A * | 2/1989 | Lautzenhiser ......... 180/65.1 |
| 4,858,483 A * | 8/1989 | Blakemore ............ 74/143 |
| 5,007,655 A * | 4/1991 | Hanna ................ 280/250.1 |
| 5,288,092 A | 2/1994 | Miller et al. | |
| 5,303,945 A * | 4/1994 | Oxford ............... 280/304.1 |
| 5,351,566 A | 10/1994 | Barnett | |
| 5,540,111 A | 7/1996 | Barnett et al. | |
| 5,632,499 A * | 5/1997 | Hutcherson et al. ..... 280/246 |
| 5,683,321 A | 11/1997 | Barnett | |
| 5,746,437 A * | 5/1998 | Faber ................ 280/304.1 |
| 5,865,455 A * | 2/1999 | Taylor ............... 280/250.1 |
| 6,024,369 A | 2/2000 | Goldstein et al. | |
| 2004/0104554 A1 | 6/2004 | Watwood et al. | |

FOREIGN PATENT DOCUMENTS

| WO | WO9301787 | 2/1993 |
| WO | WO9915397 | 4/1999 |

\* cited by examiner

*Primary Examiner*—Lesley D. Morris
*Assistant Examiner*—Maurice Williams
(74) *Attorney, Agent, or Firm*—Quarles & Brady LLP

(57) ABSTRACT

A reversible ratchet mechanism includes a pair of roller clutches set to operate in opposite directions when engaged by a belt. During the forward motion of the ratchet assembly in either direction of propulsion of the belt, one roller clutch is disengaged while the other is engaged and locked, thereby propelling the belt. During the backward stroke, the engaged roller clutch is free to rotate. The result is that the reciprocating motion of the assembly is converted into the linear motion of the belt. The ratchet assembly includes a shift mechanism to reverse the engagement of the roller clutches and change the direction of propulsion of the belt produced by the push/pull action of the operator. The invention is advantageously used in conjunction with a wheelchair.

19 Claims, 13 Drawing Sheets

REVERSIBLE RATCHET MECHANISM

BACKGROUND OF THE INVENTION

1. Field of the Invention

This invention is related in general to the field of drive mechanisms. In particular, the invention consists of a reversible ratchet mechanism for propelling a wheelchair through the reciprocating motion of a lever actuated by the occupant of the chair.

2. Description of the Prior Art

Wheelchairs, bicycles, and other types of wheeled vehicles are typically propelled by a user imparting energy through a rotation arc. For example, a bicycle is powered by the rider applying a force that produces a tangential component along the circular path of rotation of the pedals. A wheelchair is hand powered in similar manner by gripping the circular rails attached to the wheels and pushing or pulling, depending on the direction of travel, along an arc of the rail. Because the rails follow the rotation of the wheels, the motion of the user's hands necessarily travel through the arc, which requires a continual change in the direction of application of the force in order to optimize the tangential resultant that provides the rotational motion of the wheels. This unusual motion involves the use of a different group of muscles than is required to push or pull in linear motion. Therefore, it is apparent that a person could apply more force by operating a handle in linear fashion along a straight path. The linear motion of the handle could then be converted to rotational motion in any conventional manner to propel the wheelchair.

Moreover, it has been found that the nonlinear motion associated with the hand propulsion of a wheelchair, transmitted to the arms and shoulders, after prolonged use can have a debilitating effect on the user's muscles, tendons and ligaments in the form of tendonitis, muscle weakness, and even arthritis. Therefore, also for this reason a repetitive linear motion would be highly preferable to the arc motion inherent with the use of a conventional wheelchair. In particular, it would be very desirable to have a device enabling a person to propel a wheelchair by pushing or pulling, depending on the direction of motion, a set of reciprocating levers coupled to the armrests of the chair.

The prior art is replete with devices for driving wheelchairs, bicycles, and other types of wheeled vehicles by applying a force in some manner. In U.S. Pat. No. 5,683,321, Barnett describes a drive apparatus for converting linear motion to rotary motion for continuously transmitting power to an axle, such as in a wheelchair. The drive apparatus consists of a flexible ratch, such as a chain, belt or cable, and first and second energy-transmitting members for releasably engaging the ratch. The energy-transmitting members are moved by hand in reciprocating linear motion along the flexible ratch, which is alternately engaged and driven by one or the other of the energy-transmitting members. Every time the direction of motion is reversed, the engagement of the energy-transmitting members to the ratch is also reversed and the resulting reciprocating linear strokes are converted to unidirectional linear motion, which is then converted to a rotational motion suitable to propel the wheelchair or other device.

The Barnett device, however, does not allow a user to change the direction of the rotational motion without employing a second pair of energy-transmitting members. Moreover, because the flexible ratch is always engaged by one of the members, a significant effort is required while applying force in both directions. Therefore, there is still a need for a reversible mechanism that allows propulsion of a wheelchair by applying force to an actuating lever in linear, reciprocating fashion.

SUMMARY OF THE INVENTION

The invention is a reversible ratchet assembly for converting the reciprocating linear motion produced by an actuating force into the unidirectional linear motion of a propelling belt, chain, cable, or the like. Such latter motion is then advantageously converted into rotational motion in conventional manner in order to drive a mechanism of choice, such as the wheels of a wheelchair. The ratchet assembly is coupled to a track on each armrest of the chair that allows it to be moved back and forth in reciprocal push/pull motion through a hand-operated handle. The assembly includes a ratchet mechanism adapted to engage a ratch in one direction of motion of the assembly while releasing it in the opposite direction. Accordingly, the reciprocal motion of the ratchet assembly is converted into the unidirectional motion of the ratch.

According to the main aspect of the invention, the ratchet mechanism is reversible, so that it may be used to engage the ratch in either direction while disengaging it in the opposite direction. As a result, the assembly of the invention may be used advantageously in applications wherein it is desirable to provide propulsion in both directions of travel, such as in wheelchairs. In the preferred embodiment, the ratchet mechanism consists of a pair of roller clutches with meshes set to operate in opposite directions when engaged by the meshes of a belt. In either direction of motion of the belt, one roller clutch is disengaged while the other is engaged and locked during the forward motion of the ratchet assembly, thereby propelling the belt, and it is free to rotate idly during the backward stroke. The result is that the reciprocating motion of the assembly is converted into the linear motion of the belt. The ratched assembly includes a shift mechanism to reverse the engagement of the roller clutches and change the direction of propulsion of the belt produced by the push/pull action of the operator.

When used in conjunction with a wheelchair, several additional features are preferably combined with the invention. In either operating mode (forward or reverse), the locked condition of the ratchet mechanism could cause the chair to tip over if pushed to cause the mechanism to reach the end of its track and prevent the further motion of the belt. Accordingly, a safety mechanism is placed at each end of the track traveled by the ratchet assembly to automatically disengage the locked roller clutch from the belt when it reaches the end of the track. Thus, the wheelchair cannot be pushed in either direction to the point of causing the fall of its occupant when the ratchet mechanism is being used.

Similarly, a brake is preferably combined with the operating handle of the ratchet mechanism of the invention in order to provide better control of the wheelchair. A conventional bicycle brake (disk or pad), is mounted on the wheel and a cable is used to connect the brake to a hand lever hinged to the operating handle. Such a brake is obviously a necessity if the rails coupled to the conventional wheels of wheelchairs are removed in conjunction with the installation of the ratchet mechanism of the invention. Since each wheel of a wheelchair is independently operable, it is clear that in practice the invention is implemented by installing a separate ratched assembly and a corresponding separate brake on each side of the chair, each being actuated by a hand of the operator.

Finally, the ratchet assembly of the invention is preferably attached to movable armrests that can be pivoted up or down with respect to their normal horizontal position. This feature allows the occupant of the wheelchair to change position during use to provide some comfort after extended operation. It also facilitates the use of the wheelchair near a table or other obstruction by enabling the user to lower or raise the armrests out of the way.

Various other purposes and advantages of the invention will become clear from its description in the specification that follows and from the novel features particularly pointed out in the appended claims. Therefore, to the accomplishment of the objectives described above, this invention comprises the features hereinafter illustrated in the drawings, fully described in the detailed description of the preferred embodiments and particularly pointed out in the claims. However, such drawings and description disclose just a few of the various ways in which the invention may be practiced.

DESCRIPTION OF THE PREFERRED EMBODIMENT OF THE INVENTION

This invention is based on the idea of combining a ratch with two roller clutches operating in opposite directions to provide a reversible ratchet mechanism capable of converting reciprocating motion into unidirectional motion. Because of its reversible feature, the invention is particularly suitable for use on a wheelchair, although it could be used advantageously in any other application wherein such conversion is desirable.

As used herein, "roller clutch" means a roller that can rotate freely in one direction while capable of remaining locked in fixed position when urged in the opposite direction. The term "ratch" is intended to mean any means suitable for engagement by a coupling mechanism to transfer motion, such as a belt, chain, cable, or rack. In the preferred embodiment of the invention, such a ratch is a capable of engagement with a roller clutch by any means, such a teeth, meshes, or simply friction. "Carrier arm" is used to refer to the structure supporting the reciprocating ratchet mechanism of the invention, regardless of whether it is fixed or pivotally adjustable and, in the latter case, regardless of where it is hinged. Finally, with reference to the idle rollers, safety rollers and guide rollers described below, these terms are intended to include any type of fixed, low-friction skids that could be used in lieu thereof.

Figure 1:
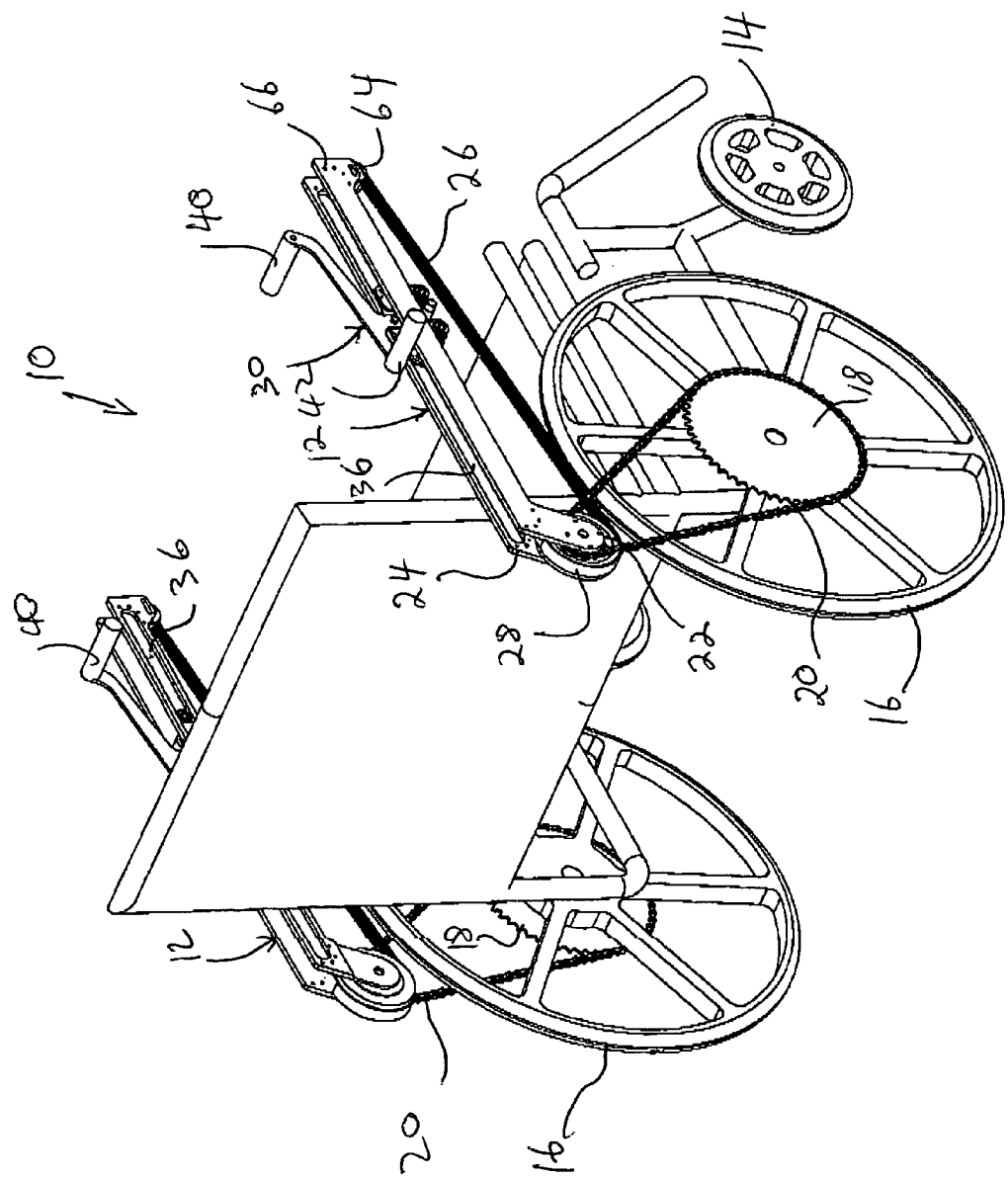
FIG. 1 is an perspective view of the invention as implemented in a wheelchair.

Referring to the figures, wherein like parts are designated throughout with the same reference numerals and symbols, FIG. 1 illustrates in perspective view a conventional wheelchair 10 wherein each armrest has been modified to produce a carrier arm 12 with a ratchet mechanism for propelling the chair through the reciprocating linear motion of a handle according to the invention. The wheelchair 10 includes a set of independent free-wheeling front wheels 14 and independently driven rear wheels 16. Since the invention would normally be implemented in mirror-image configuration with respect to each side of the wheelchair, it will described only with reference to a single traction wheel 16. A hub sprocket 18 is used to propel the wheel 16 by means of a chain 20 driven by a transmission gear 22 mounted at the back end 24 of the carrier arm 12. The transmission gear 22 is in turn driven by a toothed belt 26 coupled to a rear pulley 28 axially connected to the gear. Therefore, the wheel 16 is rotated in one direction or the other according to the direction of motion of the belt 26. It is understood that the propulsion mechanism just described is conventional in nature and could be implemented in many other equivalent ways within the scope of the invention, which resides in the ratchet mechanism used to drive the belt 26.

Figure 2:
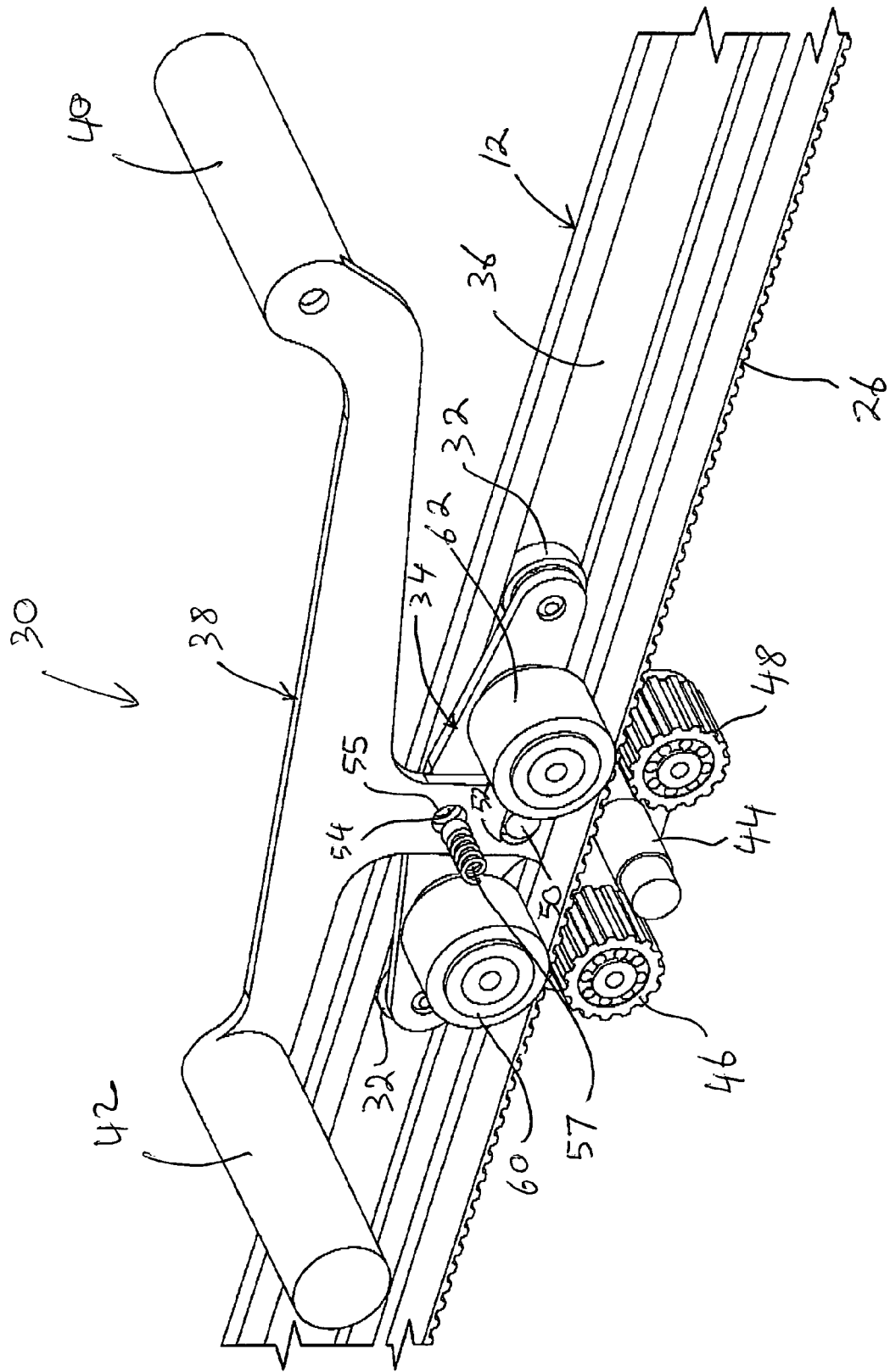
FIG. 2 is a partial perspective view of the carrier arms of a modified wheelchair showing the preferred embodiment of a reversible ratchet assembly according to the invention.
Figure 3:
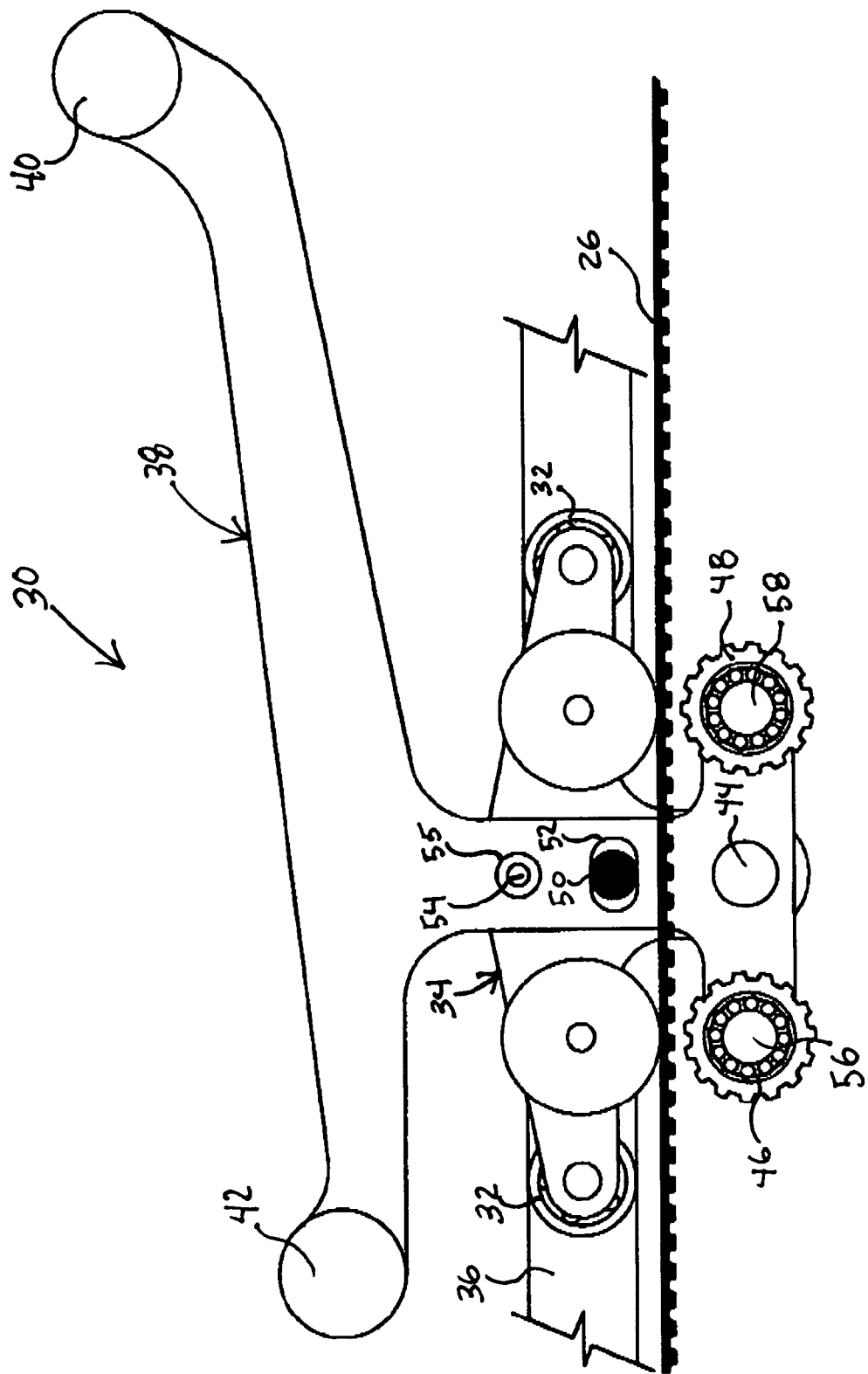
FIG. 3 is a schematic elevational view of the reversible ratchet assembly of FIG. 2 in neutral position.
Figure 4:
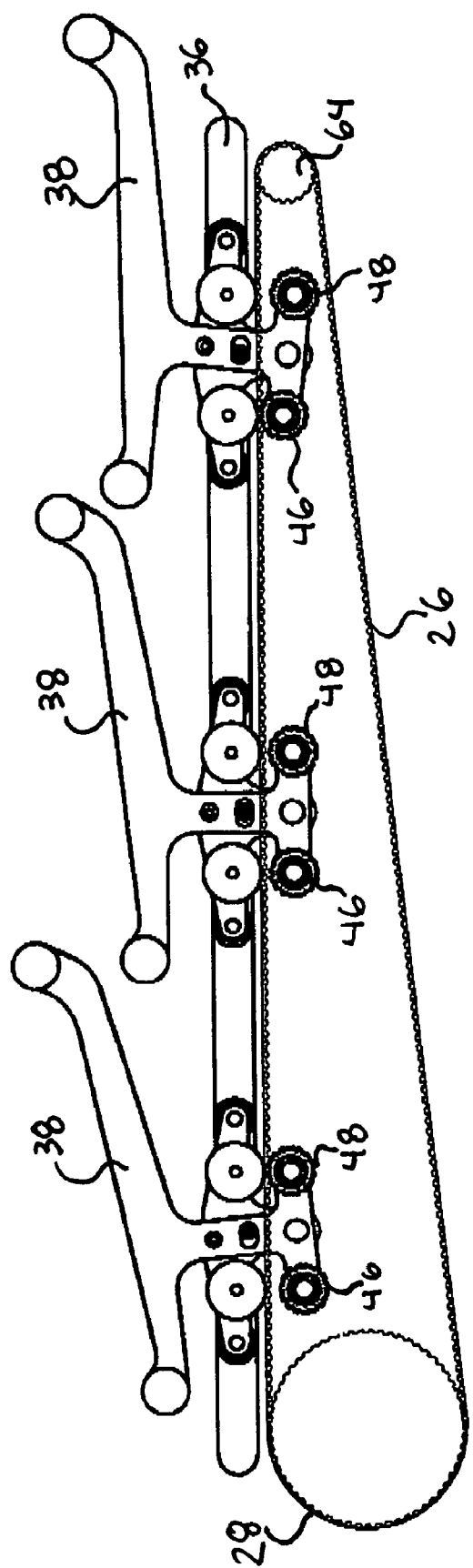
FIG. 4 is an illustration of the ratchet assembly of the invention in relation to the belt in forward, neutral and reverse position.

As better seen in the partial perspective view of FIG. 2 and the elevational view of FIG. 3, the apparatus of the invention consists of a ratchet assembly 30 that includes two pairs of free-wheeling guide rollers 32 attached to a frame 34 in the assembly and mounted on straight tracks 36 on opposite sides of each carrier arm 12 of the chair. (It is noted that the views of FIG. 3 and FIGS. 4-8 and 11-13, which follow, are schematic representations wherein some of the parts are shown as visible for simplicity, rather than in phantom line as an accurate representation consistent with FIGS. 1 and 2 would require.) The length of the tracks 36 defines the stroke of the ratchet assembly 30 in the reciprocating motion required to propel the chair. The assembly 30 further includes a thrust lever 38 with a handle 40 for gripping by the occupant of the wheel chair and an elbow support 42 upon which the occupant's forearm may be rested for comfort. The lever 38 is hinged in the assembly upon a fulcrum 44 through which the lever can be pivoted into three distinct positions to cause various conditions of engagement of two roller clutches 46,48 rotatably mounted on the lever. As illustrated in FIG. 4, the lever 38 may be placed in a neutral position (center view), wherein the roller clutches 46,48 are both disengaged, or it may be shifted to a forward or a reverse position (right and left views, respectively), wherein one roller clutch is engaged by the belt 26 while the other is free. A fixed pin 50 in the frame 34 is used to limit the range of motion of the lever 38 by engaging a travel slot 52 that is appropriately sized to stop the motion in either direction in a position that ensures meshing of the pertinent roller clutch with the belt 26. Retaining notches 54 in the frame 34 (seen through a hole 55 in the lever 38) are used to keep the lever in each selected position by means of a spring-loaded mechanism 57 (only partially shown) mounted in the hole 55 and adapted to releasably engage a notch at each position.

Roller clutches are well known in the art as rollers that are locked in one direction but are free to rotate in the opposite direction. Such devices are sold commercially, for example, by The Timken Company of Canton, Ohio. As one skilled in the art would readily understand, the principle of a roller clutch can be implemented in similar manner in a rotating gear mounted on a fixed axle, a rotating gear and a rotating axle, or two rotating gears. In the present invention the two roller clutches 46,48 consist of an outer sprocket adapted to mesh with the belt 26 and an inner mechanism (which can be implemented in several known ways, including sprags, rollers or ratchets) which permits rotation of the sprocket in one direction but not the other. Accordingly, the roller clutches 46 and 48 are mounted in opposite fashion on two respective support axles 56 and 58 in the frame 34 of the ratchet assembly 30. In particular, the rear roller clutch 46 is configured to be rotating freely clockwise and locked when urged to rotate counterclockwise. Accordingly, when meshed to the belt 26, the roller clutch 46 may be used to push the belt forward by thrusting the lever 38 in that direction. When the lever is pull back, the roller clutch rotates freely and has no effect on the belt, even though still engaged. As a result, the reciprocating action of the ratchet assembly 30 produces the intermittent forward motion of the belt 26.

Figure 5:
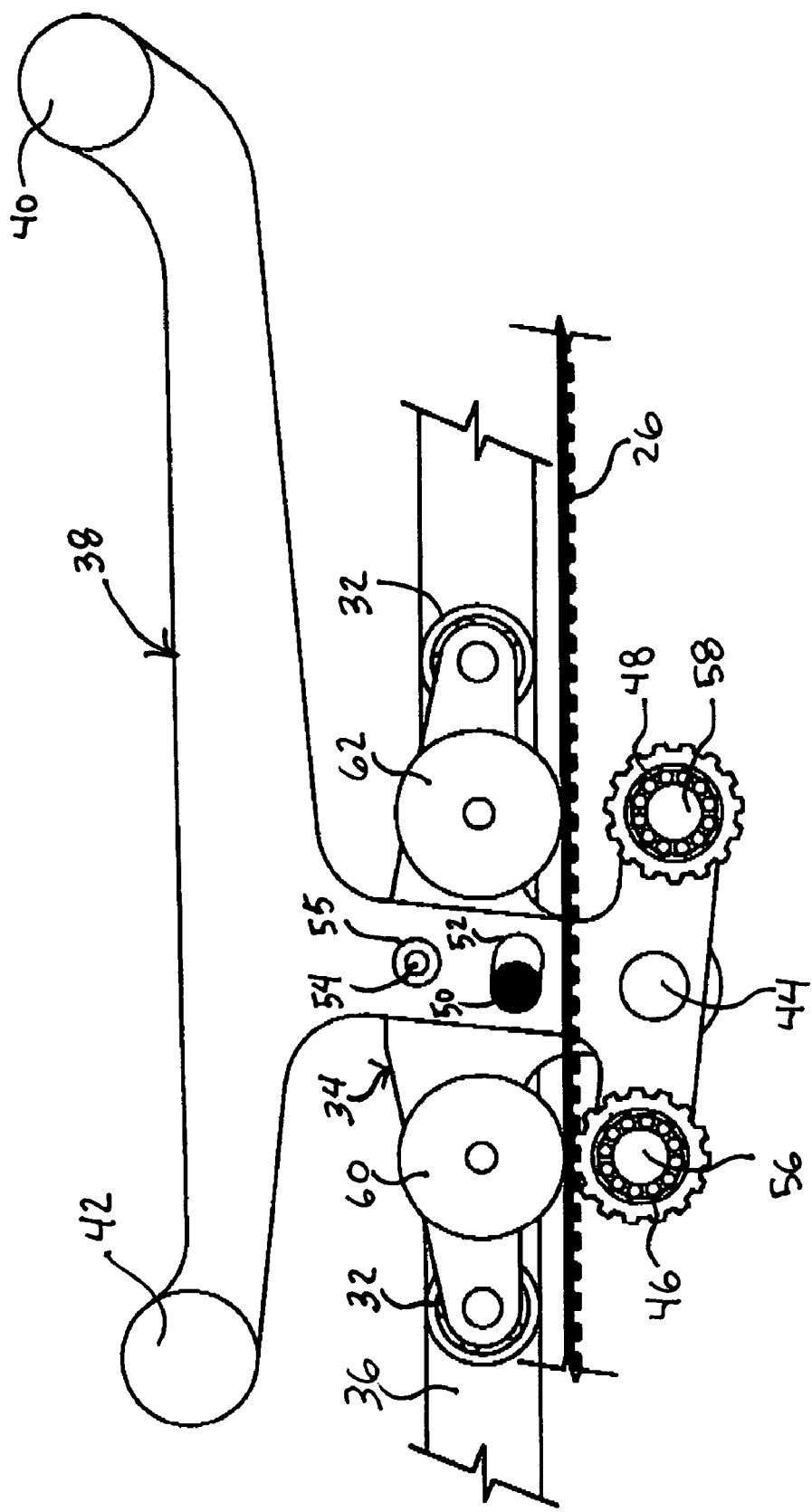
FIG. 5 illustrates in more detail the ratchet assembly of the invention in relation to the belt in forward position.
Figure 6:
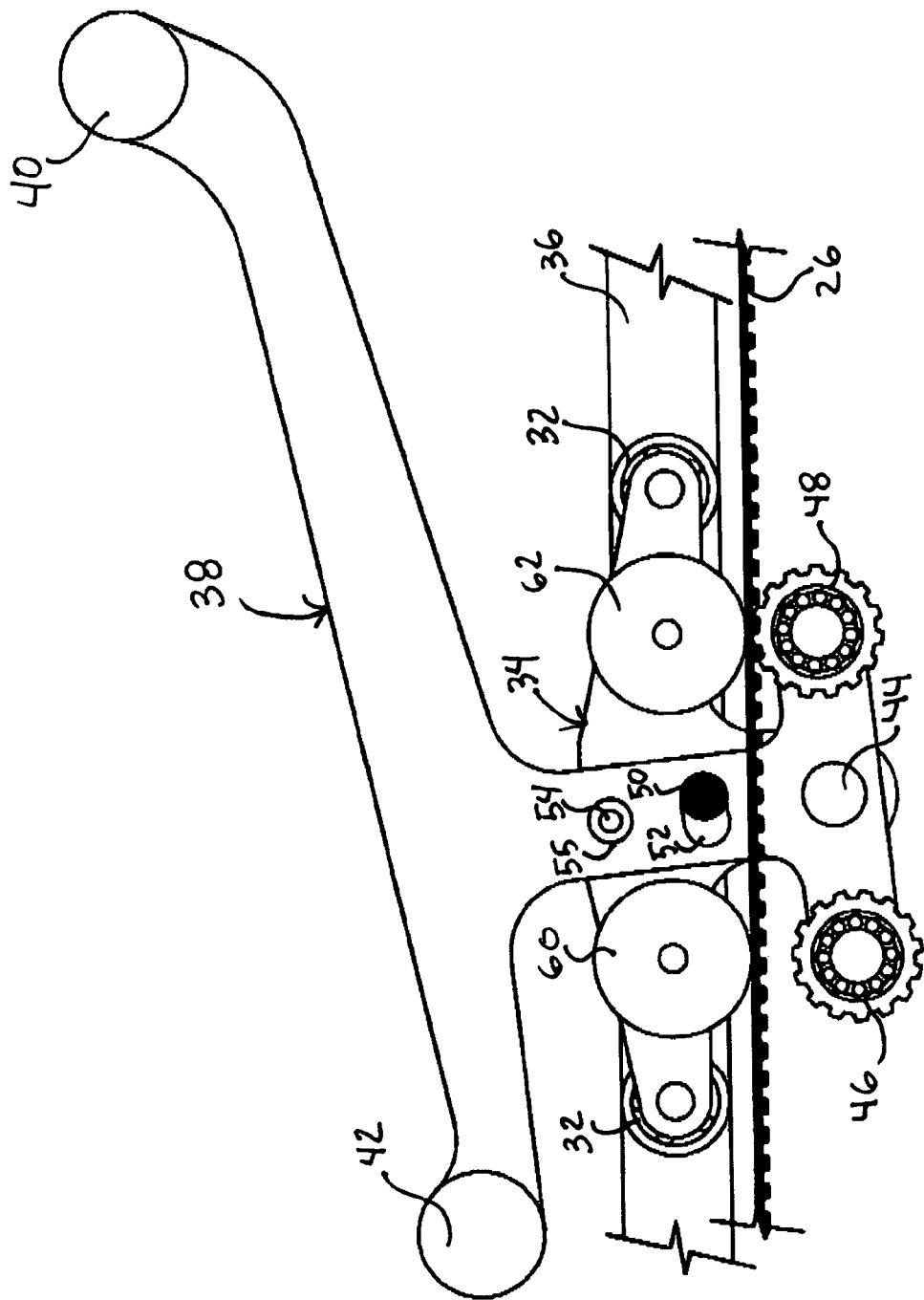
FIG. 6 illustrates the ratchet assembly in relation to the belt in forward

FIG. 5 illustrates in more detail the ratchet assembly 30 in forward position. Accordingly, as mentioned, the rear roller clutch 46 is engaged with the belt 26 while the front roller clutch 48 is disengaged. Idle rollers 60 and 62, rotatably mounted on the frame 34 opposite to the roller clutches 46 and 48, respectively, are preferably provided to ensure a firm meshing of each roller clutch to the belt 26. It is understood that any fixed, low-friction support structure could be used instead of the rollers 60,62. In the forward position, the roller clutch 56 presses the belt against the idle roller 60, ensuring that the belt could not disengage even if it became loose. Similarly, in the reverse position illustrated in FIG. 6, the roller clutch 48 presses the belt 26 against the idle roller 62 for the same purpose. The front roller clutch 48 is configured to be rotating freely counterclockwise and to become locked when urged to rotate clockwise. Accordingly, when meshed with the belt 26, the roller clutch 48 is used to drive the belt backward by pulling the lever 38 in that direction. When the lever is pushed forward, the roller clutch 48 rotates freely and has no effect on the belt, even though still engaged. As a result, the reciprocating action of the ratchet assembly 30 produces the intermittent backward motion of the belt 26. FIG. 3 shows the ratchet mechanism in neutral position wherein neither roller clutch is engaged.

Thus, it is clear that the reversible linear motion produced by the reciprocating actuation of the ratchet assembly of the invention can be used in any application where that feature may be desirable. That is particularly true in the case of wheelchairs where the traction wheels 16 need to be independently driven in both direction. Therefore, a wheelchair may be modified according to the invention to include the carrier arms 12 with travel tracks 36 and ratchet assemblies 30 in lieu of conventional armrests. On each side of the wheelchair, the forward or backward motion of the belt 26 is then transmitted to the rear pulley 28 by a front pulley 64 mounted at the front end 66 of the carrier arm 12 (see FIGS. 1 and 4).

Figure 7:
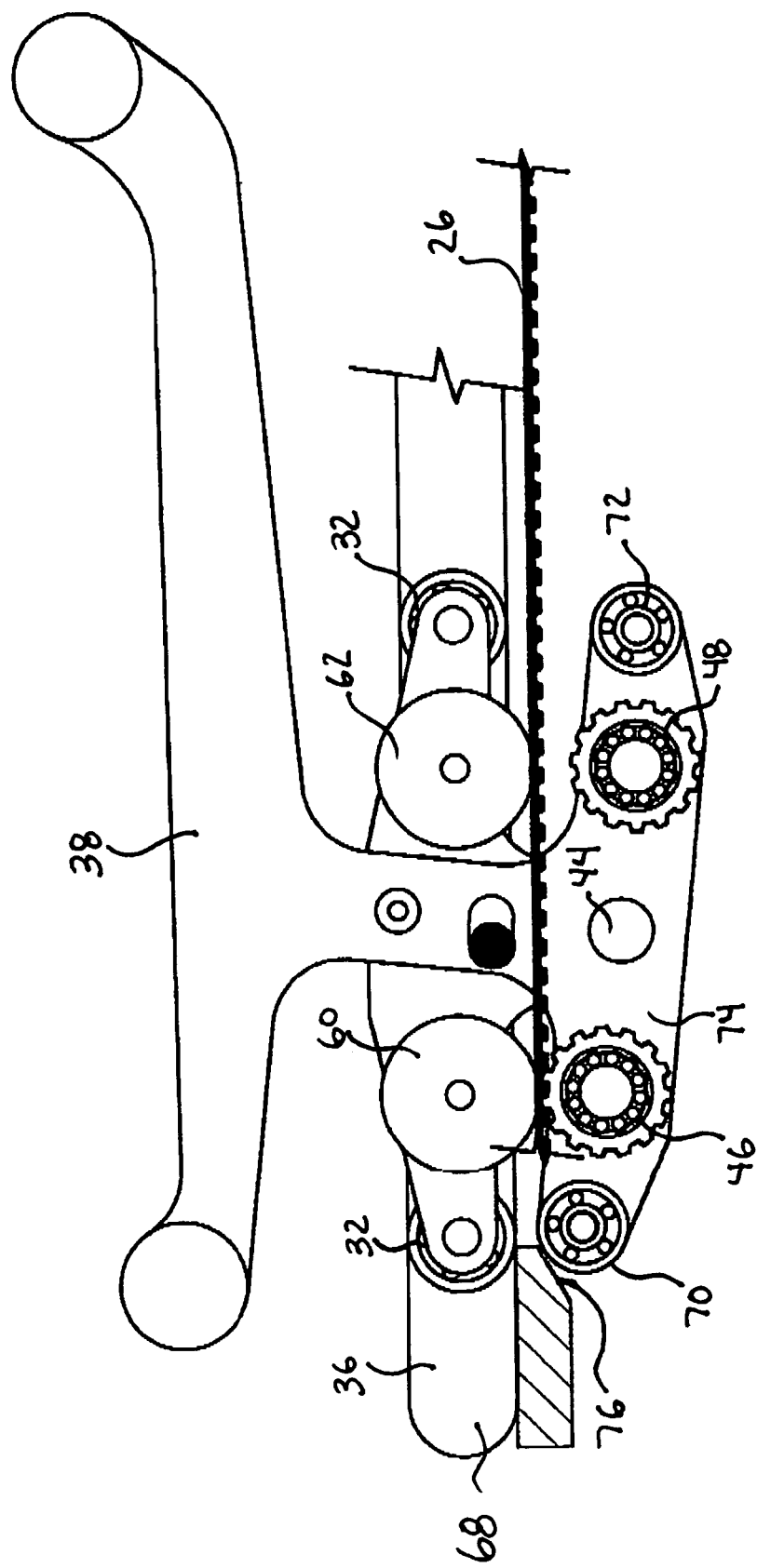
FIG. 7 illustrates a cam mechanism used to prevent a lock-up condition of the ratchet assembly of the invention at each end of the travel tracks in case the ratchet is not disengaged.

A potential problem in the wheelchair application of the invention lies in the fact that the chair could tilt either forward or backward if pushed in that direction while the ratchet mechanism is engaged. For example, when the rear roller clutch 46 is engaged for forward motion, it cannot rotate counterclockwise. Therefore, as illustrated in FIG. 7, if the chair is pushed backward to the point where the rear guide roller 32 reaches the rear end 68 of the travel track 36, thereby preventing the further backward motion of the of the belt 26 and the ratchet roller clutch 46 meshed to it, the roller clutch necessarily also stops the backward motion of the wheel 16, which could provide a fulcrum for the chair to flip backwards. A similar condition, but with the ultimate result of flipping the chair forward, could occur if the wheelchair were pushed forward when the front roller clutch 48 is engaged.

Figure 8:
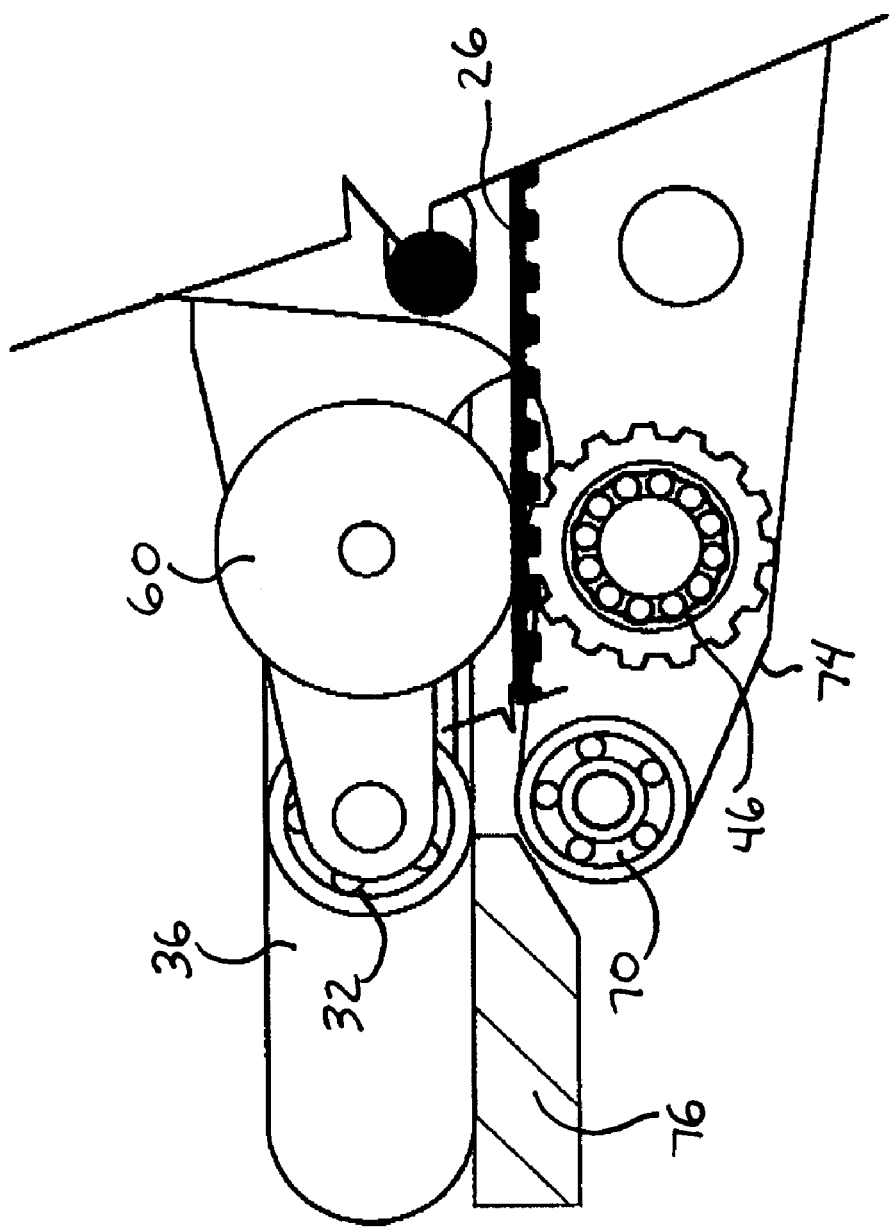
FIG. 8 is a fragmentary view of the cam mechanism of FIG. 7 showing the roller clutch after disengagement as a result of the action of the cam/roller combination of the invention.

Therefore, the preferred embodiment of the invention includes a pair of back and front rollers 70 and 72, respectively, mounted at each end of the lower portion 74 of the lever 38 substantially coplanar with the roller clutches 46,48 but offset with respect to them in order to clear the belt 26. The rollers 70,72 are adapted to force the ratchet mechanism to its neutral position as the respective guide rollers 32 approach the ends of the travel guide 36. For that purpose, a cam 76 is mounted at each end of the track structure (only the rear one is shown in the figure) so as to engage the respective roller at the end of the track and force it downward, which in turn causes the release of the belt 26 by the roller clutch 46 and prevents any further movement of the chairs as a result of the exterior force applied to it. The fragmentary view of FIG. 8 shows the roller clutch 46 after disengagement as a result of the action of the cam/roller combination of the invention. Here again, any fixed, low-friction structure similarly placed could be used instead of the rollers 70,72.

Figure 9:
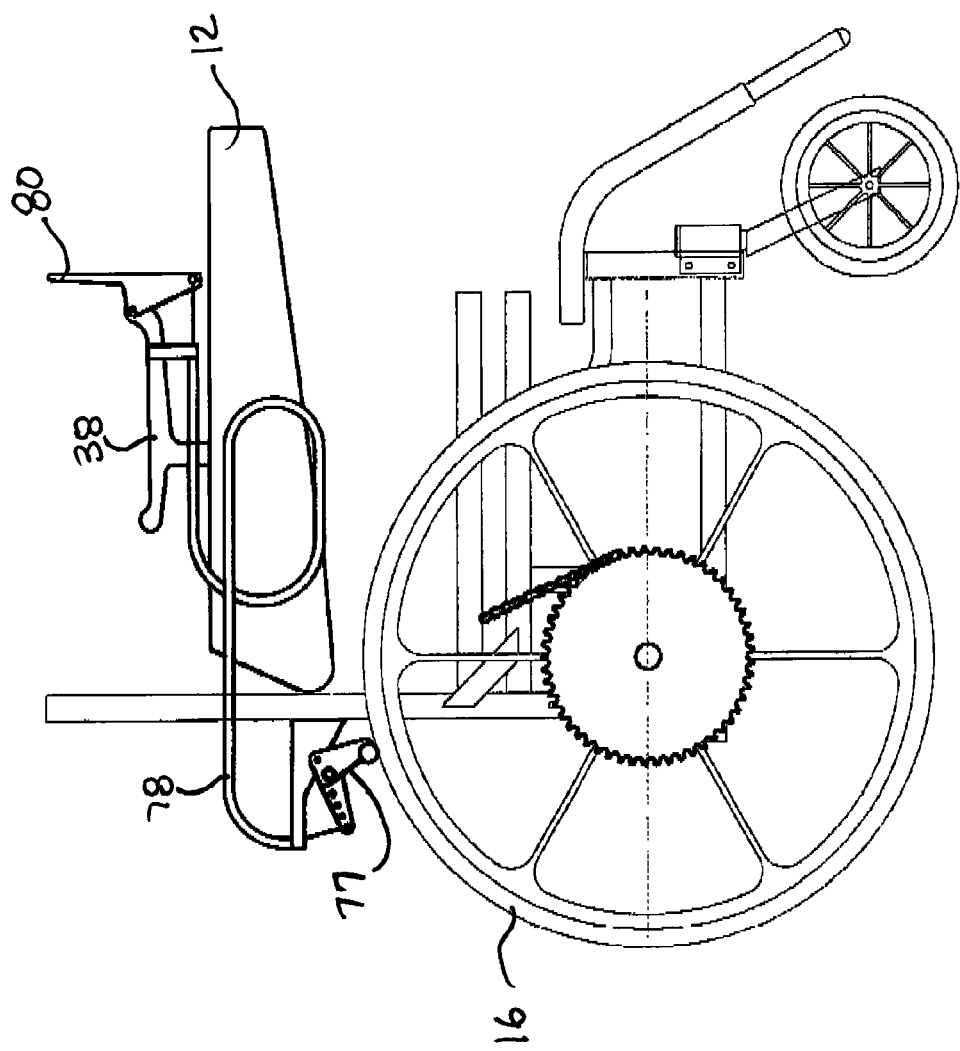
FIG. 9 is an elevational illustration of a brake system installed on a wheelchair that incorporates the reversible ratchet mechanism of the invention.

Another important addition to a wheelchair equipped with reversible ratchet mechanism of the invention is a brake for each wheel. When a wheelchair is propelled by hand, the hands themselves serve as brakes as well. On the other hand, if the conventional propulsion rails are removed from the wheels of the wheelchair in order to incorporate the reciprocating handles of the invention, no mechanism remains to effectively control stoppage. Accordingly, as illustrated schematically in FIG. 9, a conventional brake 77 may be installed on each wheel 16 of the wheelchair and connected by a traction cable 78 to a lever 80 preferably mounted on the handle 40 of the thrust lever 38. The brake 77 may be any brake known in the art and suitable for installation on the wheels of a wheelchair, either on the tire (as illustrated) or on the rim. The brake could similarly be implemented in disk configuration as done in bicycles.

Figure 10:
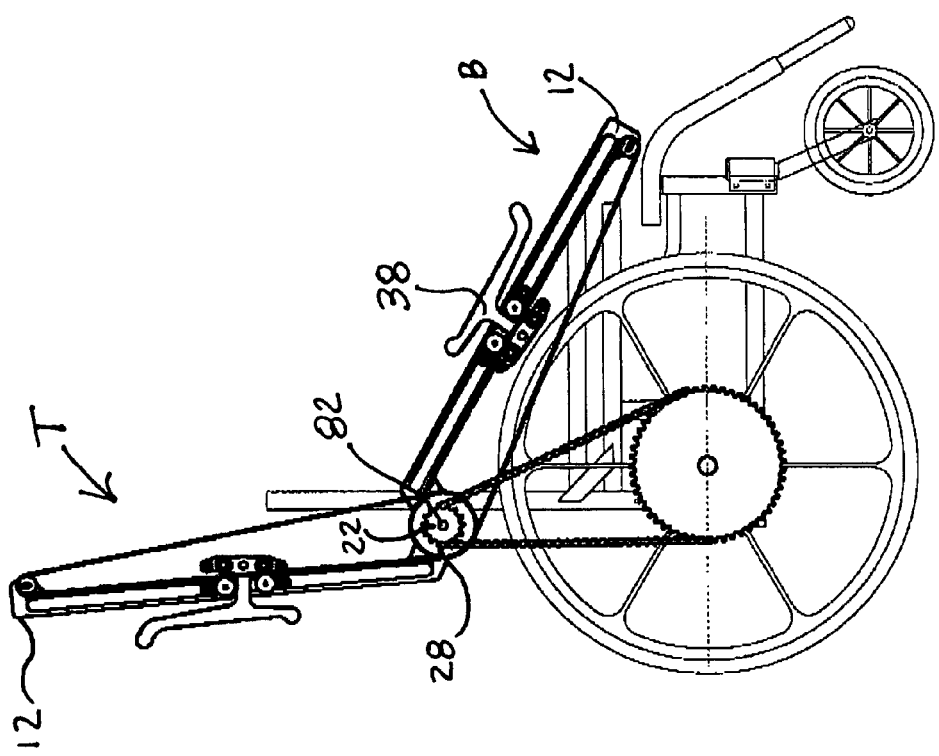
FIG. 10 is a schematic illustration of a wheelchair according to the invention including carrier arms that can be adjusted within a range of positions.
Figure 11:
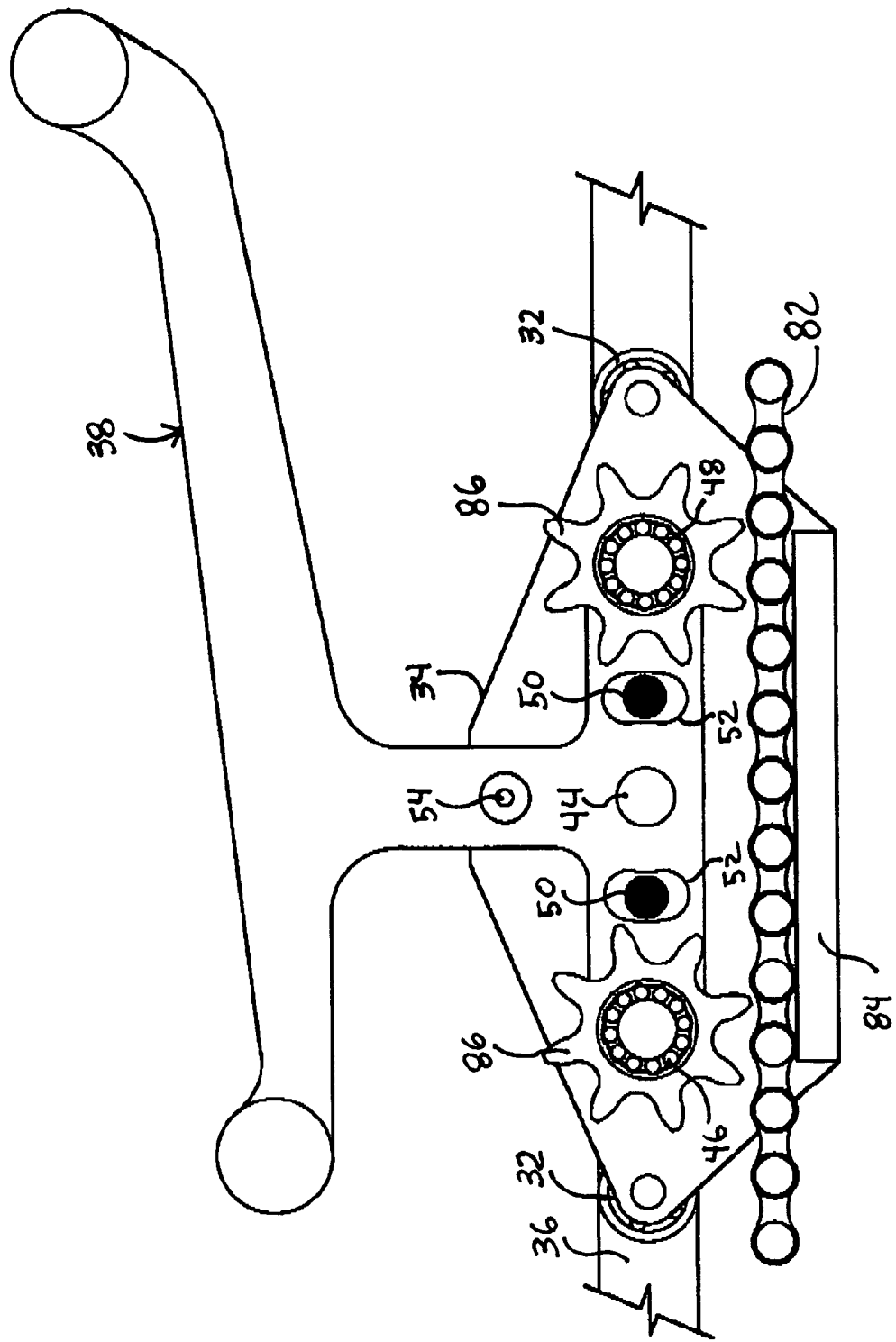
FIG. 11 is an alternative chain embodiment of the reversible ratchet mechanism of the invention.

An additional desirable feature for the wheelchair embodiment of the invention lies in a pivotable carrier arm 12. As shown in FIG. 10, the axle 82 bearing the gear and pulley combination 22,28 can be used advantageously to also provide a pivoting fulcrum for the carrier arm 12. Accordingly, the carrier arm can easily be made capable of rotation with a desired range without affecting any of the mechanical relationship described above to propel the wheelchair. For example, an upper extreme position shown as T in the figure could be provided to allow the occupant to slide the wheelchair under a low table. Similarly, a lower extreme position shown could be provided to permit operation of the ratchet assembly with a downward motion of the hands. Intermediate positions would also be desirable to provide a variety of optional operating positions to the user of the chair It is understood that the invention lies broadly in the reversible ratchet mechanism described above and that the wheelchair implementation, while representing the thrust beyond it, is only one application for which the invention is believed to provide an advantage. Therefore, it is not intended to be so limited. It is also recognized that those skilled in the art may implement the invention using similar but different components. For example, the rollers 32 traveling in the track 36 could be replaced by fixed, low-friction skids. Also, as illustrated schematically in FIG. 11, the invention could be implemented with a chain 82 supported by a skid plate 84 and roller clutches 46,48 with circumferential sprockets 86 adapted to engage the chain. Because the roller clutches are positioned above the chain (a configuration that could be implemented as well with the belt 26), the lever 38 is modified to pivot around the fulcrum 44 above the chain 82 and two sets of pin/slot arrangements (50,52) are used to limit the shifting travel of the lever, as described with reference to the belt implementation. Similarly, the roller track combination (32,36) could easily be replaced by slides consisting of tubular sleeves riding over fixed rods, such as sold by Thomson Industries, Inc., of Port Washington, N.Y.

Figure 12:
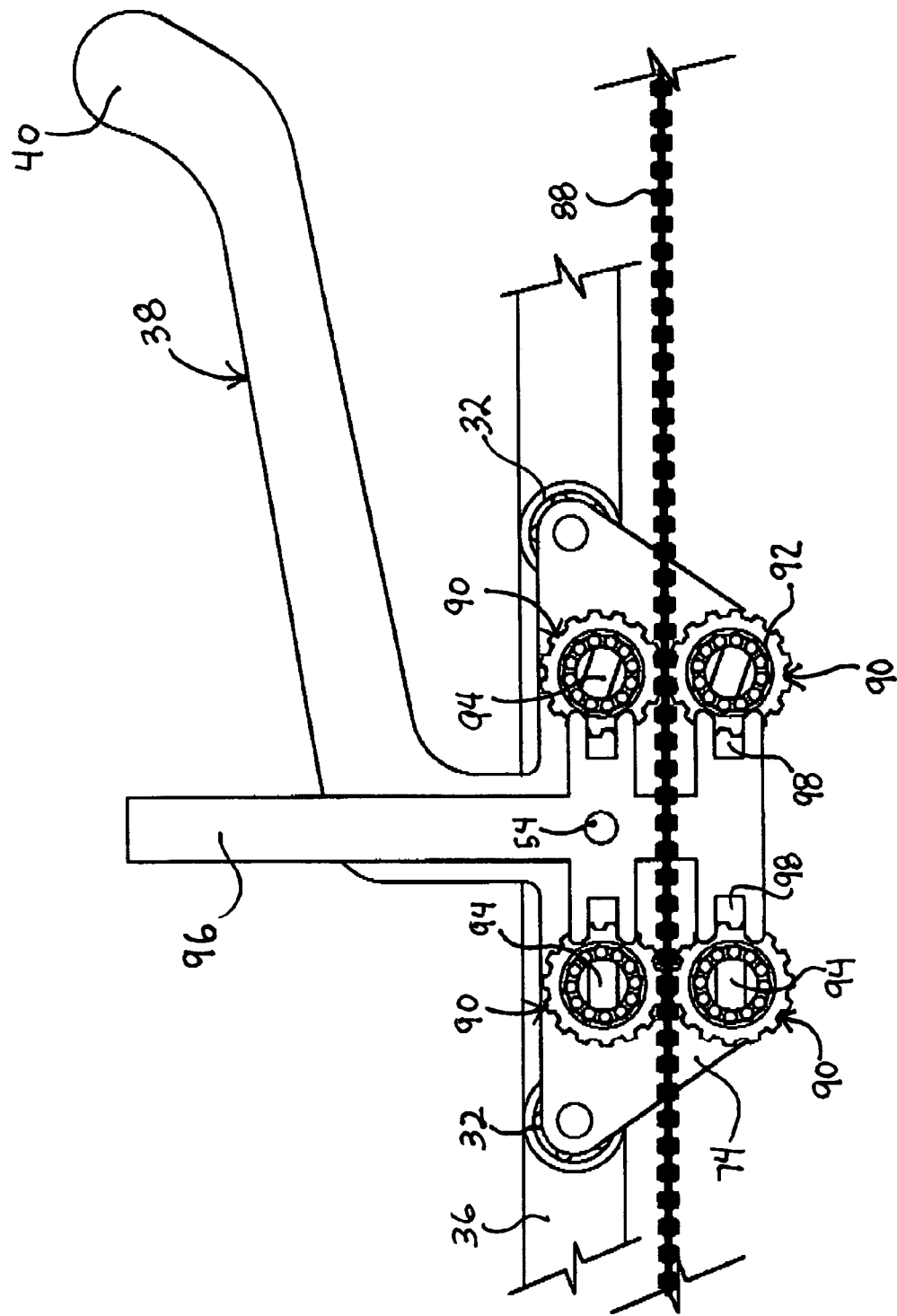
FIG. 12 is another alternative chain embodiment of the reversible ratchet mechanism of the invention.
Figure 13:
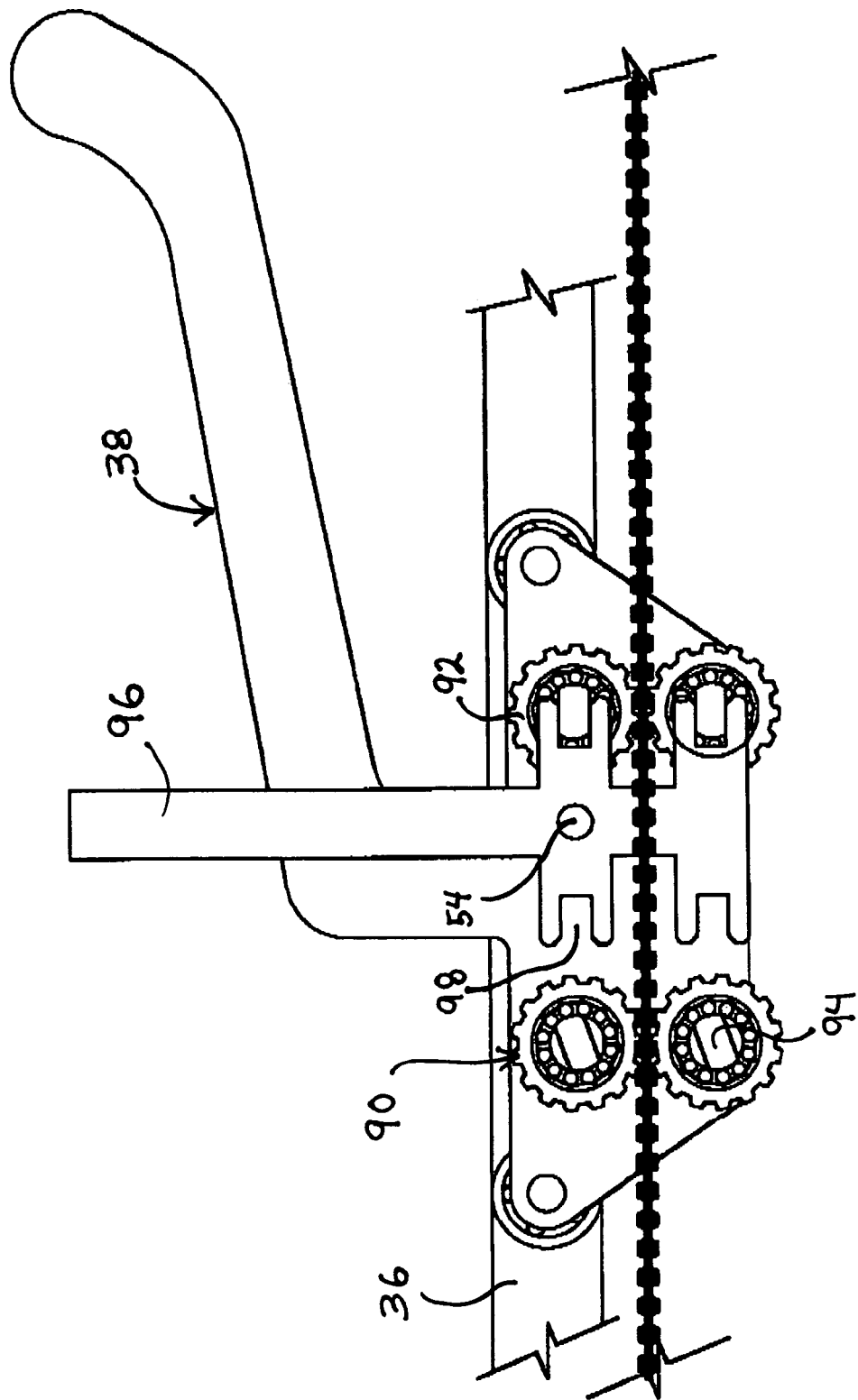
FIG. 13 shows the embodiment of FIG. 12 in locked position.

Another embodiment is illustrated in FIGS. 12 and 13, wherein a double sided belt 88 is utilized and four roller clutches 90 are used to permanently clamp the belt. Each roller clutch 90 is rotatably mounted on the lower portion 74 of the handle 38 and is equipped with an outer sprocket 92 that can be set by a detent 94 either to rotate freely or to rotate in one direction only. If the detent 94 is locked in place, the roller clutch 90 operates as a roller clutch to provide the traction needed for the invention; if the detent 94 is free to rotate, the roller clutch 90 operated as a freewheeling roller. One set of opposing roller clutches 90 (the rear set, for example, but either set could be used) is configured such that, when the detent 94 is locked, the sprocket 92 is also locked in one direction of motion of the handle 38 and free in the opposite direction. Thus, the set is used to impart motion to the belt 88 when the handle is actuated. The other set of opposing roller clutches is configured to produce the same effect in the opposite direction of the handle 38. A shifter 96 with slots 98 adapted to alternatively lock in place each set of front and back detents 94, is provided to selectively lock one set of opposing rollers 90 while the other set is left unlocked. Therefore, this mechanism is also suitable to implement the reversible ratchet concept of the invention. FIG. 13 illustrates its operation in a configuration wherein the front roller clutches are locked by the shifter to provide forward propulsion.

In view of the foregoing, while the present invention has been shown and described herein in what is believed to be the most practical and preferred embodiments, it is recognized that departures can be made therefrom within the scope of the invention, which is not to be limited to the details disclosed herein but is to be accorded the full scope of the claims to embrace any and all equivalent processes and products.

I claim:

1. A reversible ratchet mechanism for converting a reciprocating motion of an actuating force to an intermittent unidirectional motion of a ratch, comprising:
    a lever adapted for reciprocating motion in relation to a support structure;
    means for alternatively coupling the ratch to the lever under a first condition of operation wherein the ratch is engaged during a first stroke of said reciprocating motion and is disengaged during an opposite second stroke, or under a second condition of operation wherein the ratch is disengaged during the first stroke and engaged during the opposite second stroke of the reciprocating motion; and
    means for selectively shifting between said first and second conditions of operation, wherein said lever is pivotally mounted on a frame adapted for said reciprocating motion in relation to a support structure; said means for alternatively coupling the ratch to the lever includes two roller clutches mounted on the lever, one roller clutch being freely rotatable clockwise and becoming locked when urged to rotate counterclockwise and the other roller clutch being freely rotatable counterclockwise and becoming locked when urged to rotate clockwise; and said one roller clutch engages the ratch during the first condition of operation and said other roller clutch engages the ratch during the second condition of operation; and further including an idle roller rotatably mounted on said frame opposite to each of said roller clutches to support said ratch when the ratch is engaged by either of the roller clutches.

2. The reversible ratchet mechanism of claim 1, further including means for supporting said ratch when the ratch is coupled to the lever.

3. The reversible ratchet mechanism of claim 1, wherein said frame includes guide rollers coupled to a travel track in said support structure to provide said reciprocating motion of the lever.

4. The reversible ratchet mechanism of claim 3, further including a safety roller coupled to the lever and a corresponding cam mounted on the frame along said track, said safety roller and cam being operable to cause the lever to shift and disengage the ratch as the ratchet mechanism approaches an end of said track.

5. The reversible ratchet mechanism of claim 1, wherein said ratch is connected to a propelling mechanism of a wheelchair.

6. The reversible ratchet mechanism of claim 1, wherein said frame includes guide rollers coupled to a travel track in said support structure to provide said reciprocating motion of the lever; and said means for selectively shifting between said first and second conditions of operation includes a fulcrum between said roller clutches, a travel slot and a fixed pin engaged by the travel slot to limit a range of motion of the lever between said first and second conditions of operation, and a retaining notch and a spring-loaded mechanism adapted to releasably engage the lever at each position corresponding to said first and second conditions of operation; and wherein the mechanism further includes an idle roller rotatably mounted on said frame opposite to each of said roller clutches to support said ratch when the ratch is engaged by either of the roller clutches, and a safety roller coupled to the lever and a corresponding cam mounted on the frame along said track, said safety roller and cam being operable to cause the lever to shift and disengage the ratch as the ratchet mechanism approaches an end of said track.

7. The reversible ratchet mechanism of claim 6, wherein said ratch is connected to a propelling mechanism of a wheelchair.

8. In a wheelchair, the improvement comprising:
    a carrier arm;
    a reversible ratchet mechanism mounted on the carrier arm for converting a reciprocating motion of an actuating force to an intermittent unidirectional motion of a ratch coupled to a propelling mechanism for a wheel of the wheelchair;

a lever adapted for reciprocating motion in relation to the carrier arm;

means for alternatively coupling the ratch to the lever under a first condition of operation wherein the ratch is engaged during a first stroke of said reciprocating motion and is disengaged during an opposite second stroke, or under a second condition of operation wherein the ratch is disengaged during the first stroke and engaged during the opposite second stroke of the reciprocating motion; and means for selectively shifting between said first and second conditions of operation; wherein said lever is pivotally mounted on a frame adapted for said reciprocating motion in relation to the carrier arm; said means for alternatively coupling the ratch to the lever includes two roller clutches mounted on the lever, one roller clutch being freely rotatable clockwise and becoming locked when urged to rotate counterclockwise and the other roller clutch being freely rotatable counterclockwise and becoming locked when urged to rotate clockwise; and said one roller clutch engages the ratch during the first condition of operation and said other roller clutch engages the ratch during the second condition of operation; and further including an idle roller rotatably mounted on said frame opposite to each of said roller clutches to support said ratch when the ratch is engaged by either of the roller clutches.

9. The improvement of claim 8, further including means for supporting said ratch when the ratch is coupled to the lever.

10. The improvement of claim 8, wherein said frame includes guide rollers coupled to a travel track in said carrier arm to provide said reciprocating motion of the lever.

11. The improvement of claim 10, further including a safety roller coupled to the lever and a corresponding cam mounted on the frame along said track, said safety roller and cam being operable to cause the lever to shift and disengage the ratch as the ratchet mechanism approaches an end of said track.

12. The reversible ratchet mechanism of claim 8, wherein said means for selectively shifting between said first and second conditions of operation includes a fulcrum between said roller clutches; a travel slot and a fixed pin engaged by the travel slot to limit a range of motion of the lever between said first and second conditions of operation; and a retaining notch and a spring-loaded mechanism adapted to releasably engage the lever at each position corresponding to said first and second conditions of operation.

13. The improvement of claim 8, wherein said carrier arm is pivotally adjustable over a range of angular position.

14. The improvement of claim 8, further comprising a brake operable on said wheel of the wheelchair.

15. The improvement of claim 8, wherein said frame includes guide rollers coupled to a travel track in said carrier arm to provide said reciprocating motion of the lever; said means for selectively shifting between said first and second conditions of operation includes a fulcrum between said roller clutches, a travel slot and a fixed pin engaged by the travel slot to limit a range of motion of the lever between said first and second conditions of operation, and a retaining notch and a spring-loaded mechanism adapted to releasably engage the lever at each position corresponding to said first and second conditions of operation; and said carrier arm is pivotally adjustable over a range of angular position; and wherein the mechanism further includes an idle roller rotatably mounted on said frame opposite to each of said roller clutches to support said ratch when the ratch is engaged by either of the roller clutches; a safety roller coupled to the lever and a corresponding cam mounted on the frame along said track, said safety roller and cam being operable to cause the lever to shift and disengage the ratch as the ratchet mechanism approaches an end of the track; and a brake operable on said wheel of the wheelchair.

16. A reversible ratchet mechanism for converting a reciprocating motion of an actuating force to an intermittent unidirectional motion of a ratch, comprising:

a lever adapted for reciprocating motion in relation to a support structure;

means for alternatively coupling the ratch to the lever under a first condition of operation wherein the ratch is engaged during a first stroke of said reciprocating motion and is disengaged during an opposite second stroke, or under a second condition of operation wherein the ratch is disengaged during the first stroke and engaged during the opposite second stroke of the reciprocating motion; and means for selectively shifting between said first and second conditions of operation, wherein said lever is pivotally mounted on a frame adapted for said reciprocating motion in relation to a support structure; said means for alternatively coupling the ratch to the lever includes two roller clutches mounted on the lever, one roller clutch being freely rotatable clockwise and becoming locked when urged to rotate counterclockwise and the other roller clutch being freely rotatable counterclockwise and becoming locked when urged to rotate clockwise; and said one roller clutch engages the ratch during the first condition of operation and said other roller clutch engages the ratch during the second condition of operation, and wherein said means for selectively shifting between said first and second conditions of operation includes a fulcrum between said roller clutches; a travel slot and a fixed pin engaged by the travel slot to limit a range of motion of the lever between said first and second conditions of operation; and a retaining notch and a spring-loaded mechanism adapted to releasably engage the lever at each position corresponding to said first and second conditions of operation.

17. The reversible ratchet mechanism of claim 16, wherein said frame includes guide rollers coupled to a travel track in said support structure to provide said reciprocating motion of the lever.

18. The reversible ratchet mechanism of claim 16, further including a safety roller coupled to the lever and a corresponding cam mounted on the frame along said track, said safety roller and cam being operable to cause the lever to shift and disengage the ratch as the ratchet mechanism approaches an end of said track.

19. The reversible ratchet mechanism of claim 16, wherein said ratch is connected to a propelling mechanism of a wheelchair.

* * * * *